United States Patent
Dubagunta (10) Patent No.: US 8,578,349 B1
(45) Date of Patent: Nov. 5, 2013

(54) SYSTEM, METHOD, AND COMPUTER READABLE MEDIUM FOR INTEGRATING AN ORIGINAL LANGUAGE APPLICATION WITH A TARGET LANGUAGE APPLICATION

(75) Inventor: Saikumar V. Dubagunta, Plano, TX (US)

(73) Assignee: Curen Software Enterprises, L.L.C., Wilmington, DE (US)

( * ) Notice: Subject to any disclaimer, the term of this patent is extended or adjusted under 35 U.S.C. 154(b) by 1721 days.

(21) Appl. No.: 11/086,120

(22) Filed: Mar. 23, 2005

(51) Int. Cl.
*G06F 9/45* (2006.01)

(52) U.S. Cl.
USPC .......................................... 717/137; 717/136

(58) Field of Classification Search
USPC ................. 717/104–109, 114, 116, 120–123, 717/136–139, 100, 140
See application file for complete search history.

(56) References Cited

U.S. PATENT DOCUMENTS

| | | | | |
|---|---|---|---|---|
| 4,714,995 A | * | 12/1987 | Materna et al. | ............... 707/201 |
| 5,465,111 A | | 11/1995 | Fukushima et al. | |
| 5,495,533 A | | 2/1996 | Linehan et al. | |
| 5,524,253 A | * | 6/1996 | Pham et al. | .................... 709/202 |
| 5,604,800 A | | 2/1997 | Johnson et al. | |
| 5,675,711 A | | 10/1997 | Kephart et al. | |
| 5,721,912 A | * | 2/1998 | Stepczyk et al. | .............. 707/102 |
| 5,778,395 A | | 7/1998 | Whiting et al. | |
| 5,812,997 A | | 9/1998 | Morimoto et al. | |
| 5,859,911 A | | 1/1999 | Angelo et al. | |
| 5,930,798 A | * | 7/1999 | Lawler et al. | .................. 707/102 |
| 5,982,891 A | | 11/1999 | Ginter et al. | |
| 6,038,500 A | | 3/2000 | Weiss | |
| 6,055,562 A | | 4/2000 | Devarakonda et al. | |
| 6,065,040 A | | 5/2000 | Mima et al. | |
| 6,088,689 A | | 7/2000 | Kohn et al. | |
| 6,113,650 A | | 9/2000 | Sakai | |
| 6,134,580 A | | 10/2000 | Tahara et al. | |
| 6,134,660 A | | 10/2000 | Boneh et al. | |
| 6,154,777 A | | 11/2000 | Ebrahim | |
| 6,167,565 A | * | 12/2000 | Kanamori | ...................... 717/146 |
| 6,172,986 B1 | | 1/2001 | Watanuki et al. | |
| 6,199,195 B1 | * | 3/2001 | Goodwin et al. | ............. 717/104 |
| 6,202,060 B1 | | 3/2001 | Tran | |
| 6,209,124 B1 | * | 3/2001 | Vermeire et al. | ............... 717/114 |
| 6,230,309 B1 | * | 5/2001 | Turner et al. | ................... 717/107 |
| 6,233,601 B1 | | 5/2001 | Walsh | |
| 6,256,773 B1 | * | 7/2001 | Bowman-Amuah | .......... 717/121 |
| 6,272,478 B1 | | 8/2001 | Obata et al. | |
| 6,282,563 B1 | | 8/2001 | Yamamoto et al. | |

(Continued)

FOREIGN PATENT DOCUMENTS

JP 2005190103 7/2005

OTHER PUBLICATIONS

Emmerich et al., "Tigra—An Architectural Style for Enterprise Application Integration," Jul. 2001, IEEE, p. 567-576.*

(Continued)

*Primary Examiner* — Qing Chen (57) ABSTRACT

A system, method, and computer readable medium for integrating an original language application with a target language application comprises receiving properties related to a source file in the original language application, parsing the source file based on the received properties into a common format for the original language application and the target language application, receiving the parsed source file by a repository module, and placing contents of the received parsed source file on an interface.

25 Claims, 4 Drawing Sheets

(56) References Cited

U.S. PATENT DOCUMENTS

| | | |
|---|---|---|
| 6,282,697 B1 | 8/2001 | Fables et al. |
| 6,304,556 B1 | 10/2001 | Haas |
| 6,330,677 B1 | 12/2001 | Madoukh |
| 6,343,265 B1 * | 1/2002 | Glebov et al. ............... 703/25 |
| 6,349,343 B1 * | 2/2002 | Foody et al. ............... 719/316 |
| 6,389,462 B1 | 5/2002 | Cohen et al. |
| 6,438,744 B2 * | 8/2002 | Toutonghi et al. ........... 717/137 |
| 6,442,537 B1 | 8/2002 | Karch |
| 6,452,910 B1 | 9/2002 | Vij et al. |
| 6,477,372 B1 | 11/2002 | Otting et al. |
| 6,496,871 B1 | 12/2002 | Koyama et al. |
| 6,600,430 B2 | 7/2003 | Minagawa et al. |
| 6,600,975 B2 | 7/2003 | Moriguchi et al. |
| 6,611,516 B1 | 8/2003 | Pirkola et al. |
| 6,629,032 B2 | 9/2003 | Akiyama |
| 6,629,128 B1 | 9/2003 | Glass |
| 6,662,642 B2 | 12/2003 | Breed et al. |
| 6,671,680 B1 | 12/2003 | Iwamoto et al. |
| 6,687,761 B1 | 2/2004 | Collins et al. |
| 6,701,381 B2 * | 3/2004 | Hearne et al. ............... 719/313 |
| 6,714,844 B1 | 3/2004 | Dauner et al. |
| 6,738,975 B1 * | 5/2004 | Yee et al. ............... 719/310 |
| 6,744,352 B2 | 6/2004 | Lesesky et al. |
| 6,744,358 B1 | 6/2004 | Bollinger |
| 6,744,820 B1 | 6/2004 | Khairallah et al. |
| 6,768,417 B2 | 7/2004 | Kuragaki et al. |
| 6,816,452 B1 | 11/2004 | Maehata |
| 6,831,375 B1 | 12/2004 | Currie et al. |
| 6,851,108 B1 | 2/2005 | Syme |
| 6,862,443 B2 | 3/2005 | Witte |
| 6,876,845 B1 | 4/2005 | Tabata et al. |
| 6,879,570 B1 | 4/2005 | Choi |
| 6,895,391 B1 | 5/2005 | Kausik |
| 6,901,588 B1 * | 5/2005 | Krapf et al. ............... 717/164 |
| 6,904,593 B1 * | 6/2005 | Fong et al. ............... 717/171 |
| 6,931,455 B1 | 8/2005 | Glass |
| 6,931,623 B2 | 8/2005 | Vermeire et al. |
| 6,947,965 B2 | 9/2005 | Glass |
| 6,951,021 B1 | 9/2005 | Bodwell et al. |
| 6,957,439 B1 * | 10/2005 | Lewallen ............... 719/328 |
| 6,963,582 B1 | 11/2005 | Xu |
| 6,981,150 B2 | 12/2005 | Little et al. |
| 6,985,929 B1 | 1/2006 | Wilson et al. |
| 6,993,774 B1 | 1/2006 | Glass |
| 7,010,689 B1 | 3/2006 | Matyas, Jr. et al. |
| 7,043,522 B2 | 5/2006 | Olson et al. |
| 7,047,518 B2 * | 5/2006 | Little et al. ............... 717/108 |
| 7,055,153 B2 | 5/2006 | Beck et al. |
| 7,058,645 B2 * | 6/2006 | Seto et al. ............... 707/101 |
| 7,062,708 B2 | 6/2006 | Mani et al. |
| 7,069,551 B2 * | 6/2006 | Fong et al. ............... 717/171 |
| 7,127,259 B2 | 10/2006 | Ueda et al. |
| 7,127,724 B2 | 10/2006 | Lewallen |
| 7,146,614 B1 * | 12/2006 | Nikols et al. ............... 719/313 |
| 7,146,618 B1 | 12/2006 | Mein et al. |
| 7,172,113 B2 | 2/2007 | Olenick et al. |
| 7,174,533 B2 | 2/2007 | Boucher |
| 7,197,742 B2 * | 3/2007 | Arita et al. ............... 717/120 |
| 7,210,132 B2 * | 4/2007 | Rivard et al. ............... 717/138 |
| 7,213,227 B2 * | 5/2007 | Kompalli et al. ............... 717/108 |
| 7,225,425 B2 * | 5/2007 | Kompalli et al. ............... 717/108 |
| 7,228,141 B2 | 6/2007 | Sethi |
| 7,231,403 B1 | 6/2007 | Howitt et al. |
| 7,237,225 B2 * | 6/2007 | Kompalli et al. ............... 717/108 |
| 7,293,261 B1 | 11/2007 | Anderson et al. |
| 7,376,959 B2 | 5/2008 | Warshavsky et al. |
| 7,475,107 B2 | 1/2009 | Maconi et al. |
| 7,477,897 B2 | 1/2009 | Bye |
| 7,496,637 B2 | 2/2009 | Han et al. |
| 7,499,990 B1 | 3/2009 | Tai et al. |
| 7,502,615 B2 | 3/2009 | Wilhoite et al. |
| 7,506,309 B2 | 3/2009 | Schaefer |
| 7,519,455 B2 | 4/2009 | Weiss et al. |
| 7,566,002 B2 | 7/2009 | Love et al. |
| 7,643,447 B2 | 1/2010 | Watanuki et al. |
| 7,660,777 B1 | 2/2010 | Hauser |
| 7,660,780 B1 | 2/2010 | Patoskie |
| 7,664,721 B1 | 2/2010 | Hauser |
| 7,681,184 B1 * | 3/2010 | Weedon et al. ............... 717/137 |
| 7,698,243 B1 | 4/2010 | Hauser |
| 7,702,602 B1 | 4/2010 | Hauser |
| 7,702,603 B1 | 4/2010 | Hauser |
| 7,702,604 B1 | 4/2010 | Hauser |
| 7,774,789 B1 | 8/2010 | Wheeler |
| 7,810,140 B1 | 10/2010 | Lipari et al. |
| 7,823,169 B1 | 10/2010 | Wheeler |
| 7,840,513 B2 | 11/2010 | Hauser |
| 7,844,759 B1 | 11/2010 | Cowin |
| 2001/0029526 A1 | 10/2001 | Yokoyama et al. |
| 2001/0051515 A1 | 12/2001 | Rygaard |
| 2001/0056425 A1 | 12/2001 | Richard |
| 2002/0016912 A1 | 2/2002 | Johnson |
| 2002/0032783 A1 | 3/2002 | Tuatini |
| 2002/0035429 A1 | 3/2002 | Banas |
| 2002/0091680 A1 * | 7/2002 | Hatzis et al. ............... 707/3 |
| 2002/0115445 A1 | 8/2002 | Myllymaki |
| 2002/0116454 A1 | 8/2002 | Dyla et al. |
| 2002/0159479 A1 | 10/2002 | Watanuki et al. |
| 2002/0162091 A1 * | 10/2002 | Crocker ............... 717/126 |
| 2002/0174222 A1 | 11/2002 | Cox |
| 2002/0196771 A1 | 12/2002 | Vij et al. |
| 2003/0009539 A1 | 1/2003 | Hattori |
| 2003/0018950 A1 | 1/2003 | Sparks et al. |
| 2003/0023573 A1 | 1/2003 | Chan et al. |
| 2003/0033437 A1 * | 2/2003 | Fischer et al. ............... 709/310 |
| 2003/0046377 A1 | 3/2003 | Daum et al. |
| 2003/0046432 A1 | 3/2003 | Coleman et al. |
| 2003/0051172 A1 | 3/2003 | Lordemann et al. |
| 2003/0055898 A1 | 3/2003 | Yeager et al. |
| 2003/0070071 A1 | 4/2003 | Riedel et al. |
| 2003/0101441 A1 | 5/2003 | Harrison et al. |
| 2003/0106044 A1 * | 6/2003 | Arita et al. ............... 717/120 |
| 2003/0106046 A1 * | 6/2003 | Arnold et al. ............... 717/129 |
| 2003/0177170 A1 | 9/2003 | Glass |
| 2003/0188293 A1 * | 10/2003 | Boucher ............... 717/114 |
| 2003/0191797 A1 | 10/2003 | Gurevich et al. |
| 2003/0191969 A1 | 10/2003 | Katsikas |
| 2003/0225789 A1 * | 12/2003 | Bussler et al. ............... 707/104.1 |
| 2003/0225935 A1 * | 12/2003 | Rivard et al. ............... 709/328 |
| 2004/0003243 A1 | 1/2004 | Fehr et al. |
| 2004/0015539 A1 * | 1/2004 | Alegria et al. ............... 709/203 |
| 2004/0037315 A1 | 2/2004 | Delautre et al. |
| 2004/0044985 A1 * | 3/2004 | Kompalli et al. ............... 717/100 |
| 2004/0044986 A1 * | 3/2004 | Kompalli et al. ............... 717/100 |
| 2004/0044987 A1 * | 3/2004 | Kompalli et al. ............... 717/100 |
| 2004/0064503 A1 | 4/2004 | Karakashian et al. |
| 2004/0078423 A1 | 4/2004 | Satyavolu et al. |
| 2004/0078687 A1 | 4/2004 | Partamian et al. |
| 2004/0082350 A1 | 4/2004 | Chen et al. |
| 2004/0088369 A1 | 5/2004 | Yeager et al. |
| 2004/0111730 A1 | 6/2004 | Apte |
| 2004/0133656 A1 | 7/2004 | Butterworth et al. |
| 2004/0148073 A1 | 7/2004 | Hawig et al. |
| 2004/0153653 A1 | 8/2004 | Abhyankar et al. |
| 2004/0172614 A1 | 9/2004 | Gallagher |
| 2004/0177160 A1 * | 9/2004 | Seto et al. ............... 709/246 |
| 2004/0194072 A1 | 9/2004 | Venter |
| 2004/0203731 A1 | 10/2004 | Chen et al. |
| 2004/0220952 A1 | 11/2004 | Cheenath |
| 2004/0221292 A1 | 11/2004 | Chiang et al. |
| 2005/0004727 A1 | 1/2005 | Remboski et al. |
| 2005/0030202 A1 | 2/2005 | Tsuboi |
| 2005/0090279 A9 | 4/2005 | Witkowski et al. |
| 2005/0114832 A1 | 5/2005 | Manu |
| 2005/0141706 A1 | 6/2005 | Regli et al. |
| 2005/0144218 A1 | 6/2005 | Heintz |
| 2005/0163549 A1 | 7/2005 | Shima et al. |
| 2005/0172123 A1 | 8/2005 | Carpentier et al. |
| 2005/0246302 A1 | 11/2005 | Lorenz et al. |
| 2005/0256614 A1 | 11/2005 | Habermas |
| 2005/0256876 A1 | 11/2005 | Eidson |
| 2005/0262155 A1 * | 11/2005 | Kress et al. ............... 707/200 |
| 2005/0273668 A1 | 12/2005 | Manning |
| 2005/0281363 A1 | 12/2005 | Qi et al. |

(56) References Cited

U.S. PATENT DOCUMENTS

| | | |
|---|---|---|
| 2006/0005177 A1 | 1/2006 | Atkin et al. |
| 2006/0031850 A1 | 2/2006 | Falter et al. |
| 2006/0040640 A1 | 2/2006 | Thompson et al. |
| 2006/0041337 A1 | 2/2006 | Augsburger et al. |
| 2006/0048145 A1 | 3/2006 | Celli et al. |
| 2006/0080646 A1 | 4/2006 | Aman |
| 2006/0090103 A1 | 4/2006 | Armstrong et al. |
| 2006/0101423 A1* | 5/2006 | Aharoni et al. ............... 717/136 |
| 2006/0111089 A1 | 5/2006 | Winter et al. |
| 2006/0112183 A1 | 5/2006 | Corson et al. |
| 2006/0121916 A1 | 6/2006 | Aborn et al. |
| 2006/0123396 A1 | 6/2006 | Fox et al. |
| 2006/0143600 A1 | 6/2006 | Cottrell et al. |
| 2006/0149746 A1 | 7/2006 | Bansod et al. |
| 2006/0167981 A1 | 7/2006 | Bansod et al. |
| 2006/0173857 A1 | 8/2006 | Jackson |
| 2006/0190931 A1* | 8/2006 | Scott et al. .................... 717/136 |
| 2006/0200494 A1 | 9/2006 | Sparks |
| 2006/0206864 A1 | 9/2006 | Shenfield et al. |
| 2006/0220900 A1 | 10/2006 | Ceskutti et al. |
| 2006/0221901 A1 | 10/2006 | Yaqub et al. |
| 2006/0245406 A1 | 11/2006 | Shim |
| 2006/0256008 A1 | 11/2006 | Rosenberg |
| 2006/0272002 A1 | 11/2006 | Wightman et al. |
| 2007/0004432 A1 | 1/2007 | Hwang et al. |
| 2007/0015495 A1 | 1/2007 | Winter et al. |
| 2007/0026871 A1 | 2/2007 | Wager |
| 2007/0103292 A1 | 5/2007 | Burkley et al. |
| 2007/0112773 A1 | 5/2007 | Joyce |
| 2007/0223432 A1 | 9/2007 | Badarinath |
| 2007/0243880 A1 | 10/2007 | Gits et al. |
| 2008/0077667 A1 | 3/2008 | Hwang et al. |
| 2010/0161543 A1 | 6/2010 | Hauser |
| 2010/0223210 A1 | 9/2010 | Patoskie |
| 2010/0235459 A1 | 9/2010 | Wheeler |

OTHER PUBLICATIONS

Bussler, Christoph, "The Role of B2B Engines in B2B Integration Architectures," Mar. 2002, ACM, p. 67-72.*
Jandl et al., "Enterprise Application Integration by means of a generic CORBA LDAP Gateway," May 2002, ACM, p. 711.*
Sutherland et al., "Enterprise Application Integration and Complex Adaptive Systems," Oct. 2002, ACM, p. 59-64.*
Gorton et al., "Architectures and Technologies for Enterprise Application Integration," 2004, IEEE.*
Ballance, et al., "The Pan Language-Based Editing System for Integrated Development Environments", *ACM*, (Oct. 1990),77-93.
Dilts, et al., "An Inteligent Interface to CIM Multiple Data Bases", *ACM, TALIP*, (Mar. 2004),vol. 3 Issue 1, pp. 491-509.
Flanagan, Roxy "Graphic + Internet related tutorials Using Winzip", indexed by www.archive.org,(Oct. 30, 2008),8 pages.
"Stuffit Deluxe", Aladdin Systems,(Jan. 1, 2004),83 pages.
Gu, T. et al., "Toward an OSGI-based infrastructure for context-aware applications", U.S. Appl. No. 11/645,190, Pervasive Computing IEE, vol. 3, Issue 4, Digital Object Identifier 10.1109/MPRV. 2004. 19,(Oct.-Dec. 2004), 9 pages.
Pantic, M et al., "Simple agent framework: an educational tool introducing the basics of AI programming", U.S. Appl. No. 11/645,190, Information Technology: Research and Education, 2003, Proceedings. ITRE2003., (Aug. 11-13, 2003),426-430
Singh, V.K. et al., "DYSWIS: An architecture for automated diagnosis of network", U.S. Appl. No. 11/645,190, Operations and Management Symposium, 2008. NOMS 2008. IEEE, (Apr. 7-11, 2008), 851-854.
Praet, et al., "Processor Modeling and Code Selection for Retargetable Compilation", Jul. 2001, ACM, TODAES vol. 6, Issue 3, (Jul. 2001), pp. 277-307.
Adnan, Syed et al., "A Survey of Mobile Agent Systems", CSE 221, Final Project, Jun. 13, 2000., 12 pages.
Baumann, J. et al., "Mole 3.0: A Middleware for Java-Based Mobile Software Agents", (1998), 18 pages
Bigus, J.P. et al., "ABLE: A toolkit for building multiagent autonomic systems", IBM Systems Journal, vol. 41, No. 3, 2002., 22 pages.
Bursell, Michael et al., "Comparison of autonomous mobile agent technologies", (May 12, 1997), 28 pages,
Sterritt, Roy et al., "From Here to Autonomicity: Self-Managing Agents and the Biological Metaphors that Inspire Them", (Jun. 2005), 8 pages.
Blackwell, John "Ramit—Rule-Based Alert Management Information Tool", *Thesis, Florida State University College of Arts and Sciences*, (2004), pp. 1-69.
Forte, "Feature Comparison of Agent and Free Agent", Retrieved from: <www.forteinc.com/agent/features.php> on Jan. 26, 2010, (2002), 3 paes.
Lockemann, Peter C., "Agents and Databases: Friends or Foes?", *Proceedings of the 9th International Database Engineering & Application Symposium (IDES '05)*, (2005), 11 pages.
Russell, Stuart et al., "Artificial Intelligence: A Modern Approach", *Pearson*, (2003), pp. 5, 32-56, 449-454.
Stallings, William "ISDN and Broadbank ISDN with Framw Relay and ATM", *Prentice-Hall*, (1999), p. 516.
"Advisory Action", U.S. Appl. No. 11/495,053, (May 26, 2010), 3 pages.
"Final Office Action", U.S. Appl. No. 11/086,102, (Jul. 1, 2010), 14 pages.
"Final Office Action", U.S. Appl. No. 11/086,121, (Jun. 16, 2010), 30 pages.
"Final Office Action", U.S. Appl. No. 11/645,197, (Jul. 19, 2010), 16 pages.
"Non Final Office Action", U.S. Appl. No. 11/645,200, (May 26, 2010), 34 pages.
"Notice of Allowability", U.S. Appl. No. 10/975,146, (Jul. 13, 2010), 2 pages.
"Notice of Allowance", U.S. Appl. No. 11/439,059, (Jul. 14, 2010), 12 pages.
Bagci, et al., "Communication and Security Extensions for a Ubiquitous Mobile Agent System (UbiMAS)", *In Proceedings of CF 2005*, Available at <http://portal.acm.org/ft_gateway.cfm?id=1062302&type=pdf&coll=guide&dl=guide&CFID=91857573&cftoken=53726080>,(May 2005), pp. 246-251.
Karnik, Neeran M., et al., "Security in the Ajanta Mobile Agent System", Softw. Pract. Exper. 31, 4 (Apr. 2001), 301-329,(2001), 28 pages.
Korba, Larry "Towards Secure Agent Distribution and Communication", In Proceedings of the 32nd Annual Hawaii International Conference on System Science—vol. 8 (Jan. 5-8, 1999). Hicss. IEEE Computer Society, Washington, DC, 8059.,(1999), 10 pages.
Poggi, Agostino et al., "Security and Trust in Agent-Oriented Middleware", OTM Workshops 2003: 989-1003,(2003), 15 pages.
Rosenberg, Jonathan et al., "Programming Internet Telephony Service", *IEEE Network*, (May/Jun. 1999), 8 pages.
Walsh, Tom et al., "Security and Reliability in Concordia", In Mobility: Processes, Computers, and Agents ACM Press/Addison-Wesley Publishing Co., New York, NY, 524-534.,(1999), 10 pages.
"Advisory Action", U.S. Appl. No. 11/645,197, (Oct. 6, 2010), 3 pages.
"Final Office Action", Application Oct. 12, 2010, 34 pages.
"Final Office Action", U.S. Appl. No. 11/645,191, (Oct. 28, 2010), 19 pages.
"Final Office Action", Application 11/645,196, (Sep. 22, 2010), 33 pages.
"Non Final Office Action", U.S. Appl. No. 11/052,680, (Nov. 19, 2012), 17 pages.
"Notice of Allowance", U.S. Appl. No. 11/086,121, (Oct. 7, 2010), 6 pages.
"Notice of Allowance", U.S. Appl. No. 11/645,195, (Oct. 7, 2010), 8 pages.
"Notice of Allowance", U.S. Appl. No. 12/714,753, (Sep. 27, 2010), 7 pages.
"Non-Final Office Action", U.S. Appl. No. 11/086,121, (Dec. 30, 2009),25 pages.
"Non-Final Office Action", U.S. Appl. No. 11/439,059, (Oct. 30, 2009),9 pages.

(56) References Cited

OTHER PUBLICATIONS

"Non-Final Office Action", U.S. Appl. No. 11/495,053, (Jun. 10, 2009),13 pages.
"Notice of Allowance", U.S. Appl. No. 11/645,292, (Nov. 17, 2009),9 pages.
"Notice of Allowance", U.S. Appl. No. 11/645,300, (Nov. 18, 2009),9 pages.
"Notice of Allowance", U.S. Appl. No. 11/645,302, (Nov. 17, 2009),8 pages.
"Notice of Allowance", U.S. Appl. No. 11/645,306, (Nov. 17, 2009),8 pages.
"Final Office Action", U.S. Appl. No. 11/052,680, (May 17, 2010), 12 pages.
"Final Office Action", U.S. Appl. No. 11/645,301, (May 12, 2010), 32 pages.
"Final Office Action", U.S. Appl. No. 11/645,303, (May 21, 2010), 32 pages.
"Non Final Office Action", U.S. Appl. No. 11/645,191, (May 5, 2010), 17 pages.
"Non Final Office Action", U.S. Appl. No. 11/645,192, (May 4, 2010), 14 pages.
"Non Final Office Action", U.S. Appl. No. 11/645,196, (Apr. 28, 2010), 29 pages.
Brandt, Raimund "Dynamic Adaptation of Mobile Code in Heterogenous Environments", Der Teschnischen Universitat Munchen,(Feb. 15, 2001), 76 pages.
Brazier, F.M.T. et al., "Generative Migration of Agents", Department of Computer Science, Faculty of Sciences, Vrije Universiteit Amsterdam; de Boelelaan 1081a, 1081 HV Amsterdam, The Netherlands {frances, bjo, steen, niek} @cs.vu.1,(Aug. 2002), 4 pages.
Christopoulou, Eleni et al., "An ontology-based context management and reasoning process for UbiComp applications", Research Academic Computer.Technology Institute, Research Unit 3, Design of Ambient Information Systems Group,.N. Kazantzaki str., Rio Campus, 26500, Patras, Greece {hristope, goumop, kameas}.@cti.gr,(Oct. 2005), 6 pages.
Hasegawa, Tetsou et al., "Inoperability for mobile agents by incarnation agents", AAMAS; Melbourne, Australia; ACM, 1-58113-683, pp. 1006-1007,(Jul. 14, 2003), 2 pages.
Jih, Wan-Rong et al., "Context-aware Access Control in Pervasive Healthcare", Computer Science and Information Engineering, National Taiwan University, Taiwan jih@agents.csie.ntu.edu.tw., {r93070, yjhsu} @csie.ntu.edu.tw,(2005), 8 pages.
Pauline, Siu Po Lam "Context-Aware State Management for Supporting Mobility in A Pervasive Environment", A thesis submitted to the University of Hong Kong in fulfillment of the thesis requirement for the degree of Master of Philosophy.,(Aug. 2004), 106 pages.
Qui-Sheng, He et al., "A Lightweight Architecture to Support Context-Aware Ubiquitous Agent System", Department of Computer Science and Engineering, Fudan.University, Shanghai 200433, Chain {hequisheng, situ} @fudan.edu.cn,(Aug. 2006), 6.
Yu, Ping et al., "Mobile Agent Enabled Application Mobility for Pervasive Computing",.Internet and Mobile Computing Lab, Department of Computing, Hong Kong Polytechnic.University, Hung Hom, Kowloon, Hong Kong {cspyu, csjcao, cswen}.@comp.polyu.edu.hk.,(Aug. 2006), 10 pages.
"Non Final Office Action", U.S. Appl. No. 11/645,197, Nov. 29, 2013
"Notice of Allowance", U.S. Appl . 12/647 964, (Nov. 30, 2010), 7 pages.
"Advisory Action", U.S. Appl. No. 11/052,680, (0Appr. 28, 201), 3 pages.
"Advisory Action", U.S. Appl. No. 11/645,303 (Jul. 28, 2010), 3 pages.
"Final Office Action", U.S. Appl. No. 10/975.827, (Sep. 15, 2010), 22 pages.
"Final Office Action", U.S. Appl. No. 11/645,192, (Sep. 15 2014), 14 pages.
"Final Office Action", U.S. Appl. No. 11/645,194, (Sep 15, 20051), 28 pages.
"Final Office Action", U.S. Appl. No. 11/645,198, (Sep. 16, 2010), 22 pages.
"Non Final Office Action", U.S. Appl. No. 11/645,301, (Jul. 30, 2010), 18 pages.
"Non Final Office Action", U.S. Appl. No. 11/645,303, (Aug. 19, 2010), 20 pages.
"Non-Final Office Action", U.S. Appl. No. 12/647,964, (Sep. 8, 2010), 5 pages.
"Notice of Allowance", U.S. Appl. No. 11/495,053, (Aug. 31, 2010), 7 pages.
"The Sims", *Sims, Electronic Arts*, (2000), 57 pages.
"Wow, World of Warcraft", Wikipedia (online), Retrieved from Internet in 2010, <URL:http://en.wikipedia.org/wiki/World_of_Warcraft>, (2010), 28 pages.
Barba, Rick "The Sims Prima's Official Strategy Guide", *Prime Publishing: ISB*: 4615-2339-1 (2000), 8 pgs.
Chang, Yao-Chung et al., "AII-IP Convergent Communications over Open Service Architecture", *2005 Wireless Telecommunications Symposium, IEEE*, 0/7803-8856, (2005), pp. 202-210.
Erfurth, Christian et al., "Migration Intelligence for Mobile Agents", examiner in U.S. Appl. 11/645,192 on Sep. 15, 2010, (2001), 8 pp.
Hinchey, Michael G, et al., "Formal Approaches to Agent-Based Systems", *2nd International Workshop FAABS*, (Oct. 2002), 291 pages.
Taylor, T.L. "Does WoW Change Everything?", *Games and Culture*, vol. 1, No. 4,. (Oct. 2006), 20 pages.

* cited by examiner

SYSTEM, METHOD, AND COMPUTER READABLE MEDIUM FOR INTEGRATING AN ORIGINAL LANGUAGE APPLICATION WITH A TARGET LANGUAGE APPLICATION

CROSS-REFERENCE TO RELATED APPLICATIONS

The present application is related to U.S. patent application Ser. No. 11/086,101 entitled SYSTEM, METHOD, AND COMPUTER READABLE MEDIUM FOR INTEGRATING APPLICATIONS IN MULTIPLE SOFTWARE LANGUAGES, U.S. patent application Ser. No. 11/086,121 entitled SYSTEM, METHOD, AND COMPUTER READABLE MEDIUM FOR INTEGRATING AN ORIGINAL APPLICATION WITH A REMOTE APPLICATION, U.S. patent application Ser. No. 11/086,211 entitled SYSTEM, METHOD, AND COMPUTER READABLE MEDIUM FOR INTEGRATING APPLICATIONS IN MULTIPLE LANGUAGES, and U.S. patent application Ser. No. 11/086,102 entitled SYSTEM, METHOD, AND COMPUTER READABLE MEDIUM FOR NORMALIZING SOURCE FILES IN MULTIPLE SOFTWARE LANGUAGES, the disclosures all of which are hereby incorporated in their entirety by reference herein.

BACKGROUND OF THE INVENTION

The present invention is related to integrating applications, and, more specifically to a system, method, and computer readable medium for integrating an original language application with a target language application.

Various limitations are associated with integrating applications such as difficulty in sharing the structure of application data and application programming interfaces (classes). As such, it is cumbersome for an application written in one language to access a functionality provided by an application written in a different language. It is currently tedious to integrate these applications because a common structure must be defined in a third language (such as Extensible Markup Language, Common Object Request Broker Architecture Event Definition Language, etc.).

The present invention overcomes these problems and limitations by providing a system, method, and computer readable medium for integrating an original language application with a target language application.

SUMMARY OF THE INVENTION

In one embodiment, a method for integrating an original language application with a target language application comprises receiving properties related to a source file in the original language application, parsing the source file based on the received properties into a common format for the original language application and the target language application, receiving the parsed source file by a repository module, and placing contents of the received parsed source file on an interface.

In another embodiment, a method for integrating an original language application with a target language application comprises receiving properties related to a source file in the original language application and parsing the source file based on the received properties into a common format for the original language application and the target language application.

In a further embodiment, a computer readable medium comprises instructions for: receiving properties related to a source file in an original language, parsing the source file based on the received properties into a common format for the original language and a target language, and receiving the parsed source file by a repository module.

In yet another embodiment, a method for integrating an original language application with a target language application comprises receiving information from an interface, wherein the information includes at least one of: a class, methods of the class, and fields of the class, wherein the methods of the class include at least one of: parameters of the method, result of the method, exceptions of the method, a data type of the parameter, a data type of the result, and a data type of the exception, wherein the fields of the class include at least one data type of the field, and integrating the original language application with the target language application based on the received information.

In yet a further embodiment, a computer readable medium comprises instructions for: receiving information from an interface, wherein the information includes at least one of: a class, methods of the class, and fields of the class, and integrating an original language application with a target language application based on the received information.

In yet another embodiment, a method for integrating an original language application with a target language application comprises receiving properties related to a target language and generating integration classes in the target language based on the received properties, wherein the generated integration classes in the target language correspond to classes in an original language.

In yet a further embodiment, a computer readable medium comprises instructions for: receiving properties related to a target language and generating integration classes in the target language based on the received properties, wherein the generated integration classes in the target language correspond to classes in an original language.

In yet another embodiment, a system for integrating applications in multiple languages comprises: a module adapted to: create a repository structure, receive properties related to an application in an original language, import source files related to the application into the repository, place contents of the repository on an interface, and receive information from the interface, wherein the information is adapted to integrate the original language application with a target language application.

DETAILED DESCRIPTION OF THE INVENTION

Figure 1:
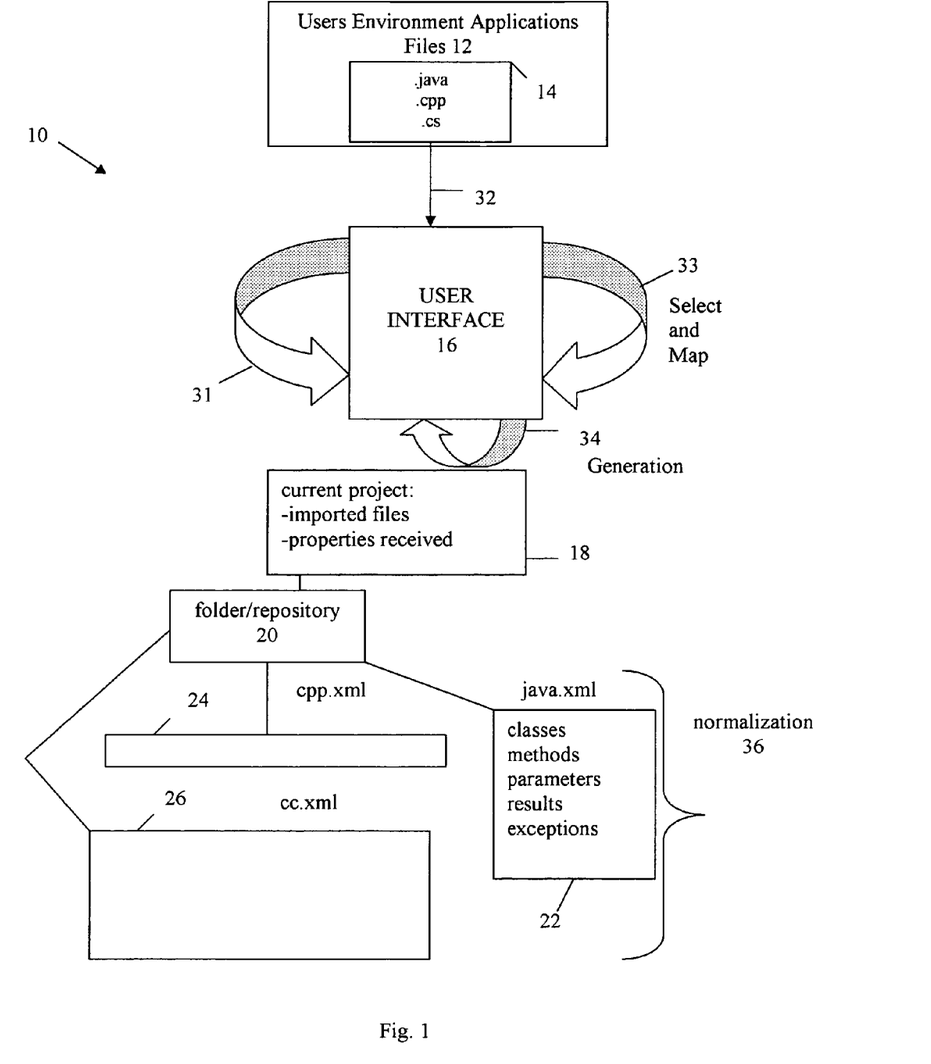
FIG. 1 depicts a flow diagram describing an integration of applications in multiple languages in accordance with an embodiment of the present invention.

Referring now to FIG. 1, a system 10 of the present invention is depicted. The system 10 includes a user's environment application files module 12, that includes various file formats 14 such as Java™, a programming language that derives much of its syntax from C and C++ but has a simpler object model and fewer low-level facilities, C++ (or cpp), and C# (or C sharp, cs), a user interface 16, a current project module 18, and a folder/repository 20. At step 31, a user (or software application) starts the user interface 16 and creates a project in the user interface. A project captures all the activities performed by the user on the user interface 16. The user imports source files 32 from his/her programming environment 12, potentially in multiple languages. The user performs a selection of classes and methods 33 in the imported files and optionally performs a mapping of parameter/return/exception data types in a source language to a target language.

The user interface 16 creates 34 a project file 18 on the computer storing the information at the project level including importing properties and generation projects. The project file 18 also contains the list of files imported into a project. The user interface 16 also creates a distinct repository file 20 for each imported source language file 22-26. A normalization function 36 in the user interface 16 normalizes the constructs in different languages into a common representation to be used by the display, and mapping and generator modules (to be described later) in the user interface.

Figure 2:
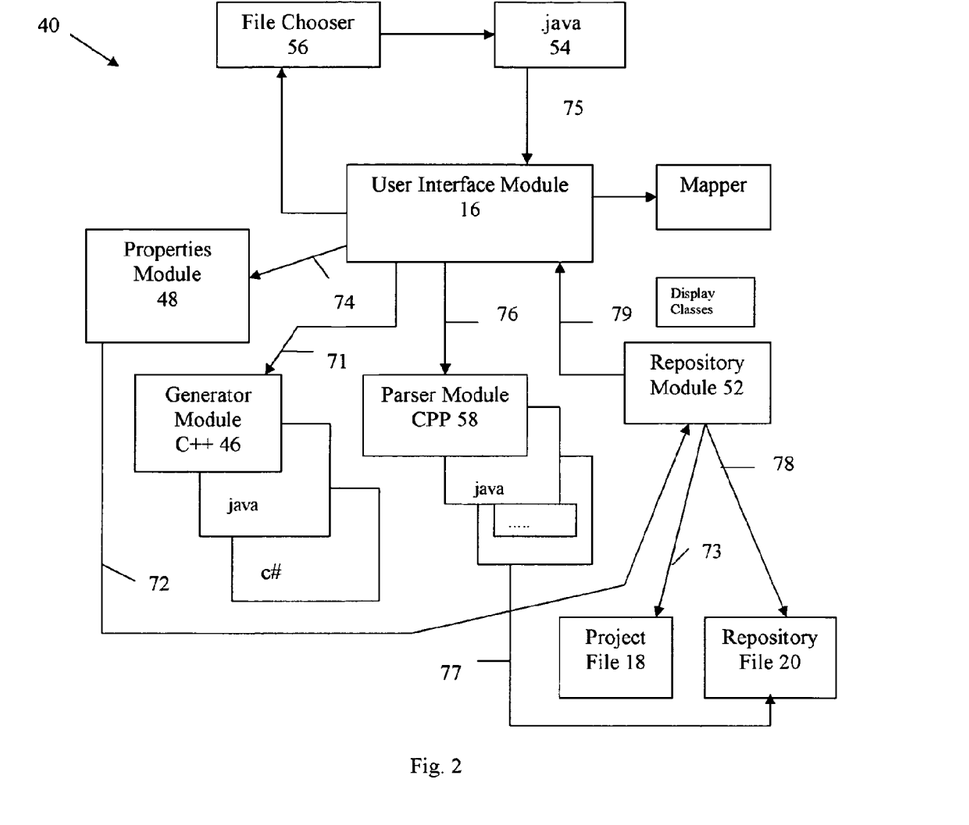
FIG. 2 depicts a flow diagram describing importing a file in accordance with an embodiment of the present invention.

Referring now to FIG. 2, another embodiment 40 of the present invention is depicted. After creating a project in the system, the user provides 71 generation properties for the various languages 46. Generation properties include namespaces to be used, directories where files are created and others. After creating a project in the system, the user provides 72 importing properties from a properties module 48 for the various languages. Importing properties include: directories, macro definitions, compiler flags and others for C++, class path, source path, VM parameters and others for JAVA™, a programming language that derives much of its syntax from C and C++ but has a simpler object model and fewer low-level facilities, and reference libraries, compiler flags and others for C#. The properties module user interface saves 73 the properties information into the project file 18. The user can optionally change 74 the properties information provided at project creation, before importing a source language file.

The user can select the importing function in the system which displays a file chooser 56 for the user to select a file 54 (in this example, a .java file). The user interface 16 invokes the parser module 58 for JAVA™, a programming language that derives much of its syntax from C and C++ but has a simpler object model and fewer low-level facilities, and passes 76 it the importing parameters so that the imported source language file can be successfully parsed. The parser module 58 for JAVA™, a programming language that derives much of its syntax from C and C++ but has a simpler object model and fewer low-level facilities, uses the repository module 52 to create 77 a repository file 20 for the imported source language file. The repository module, 52 also creates 78 a repository file 20. The user interface 16 updates 79 the view with the new data in the repository corresponding to the newly imported file.

Figure 3:
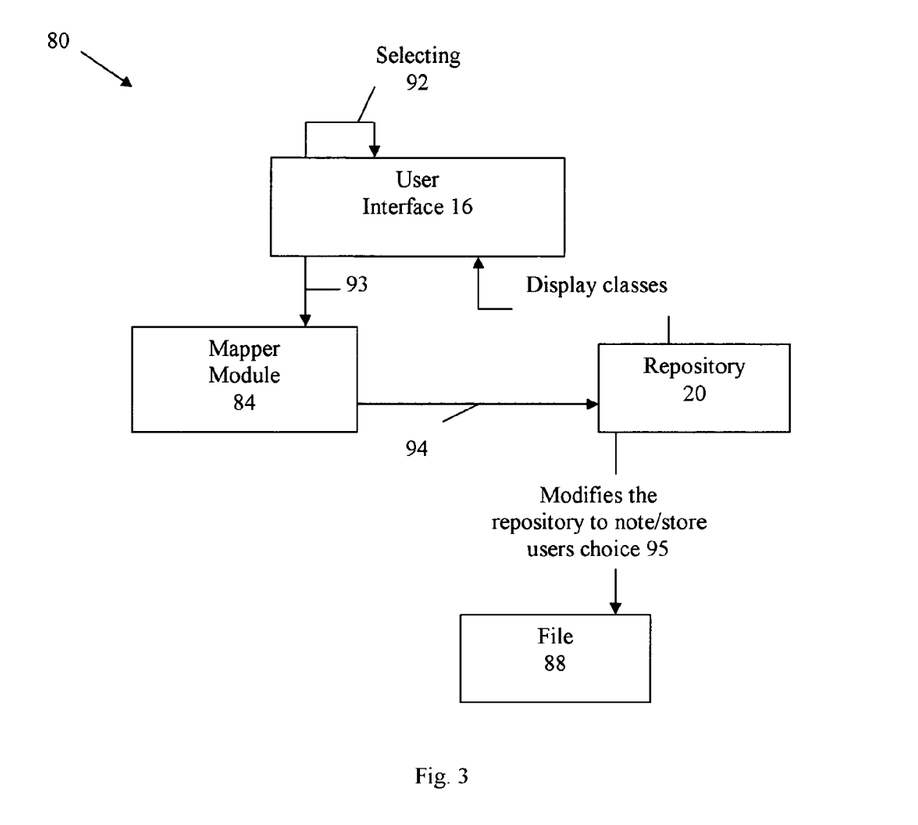
FIG. 3 depicts a flow diagram describing a mapping function in accordance with an embodiment of the present invention.

Referring now to FIG. 3, a further embodiment 80 of the present invention is depicted. After a source language file is imported into the system, the user interface 16 displays the classes in the repository (in a class explorer type view). The user performs a selection 92 of classes and methods in the classes that are of interest or should be exported to the target language application. The user or software maps 93 data types in the source language to data types in the target language, if required, using a mapping module function in the user interface. The mapping module 84 updates 94 the repository 20 in memory with the new data. The repository 20 makes 95 the user's choice persistent in a file 88 on the computer when the user chooses the save option on the user interface. The user interface 16 then updates the class view with the new data.

Figure 4:
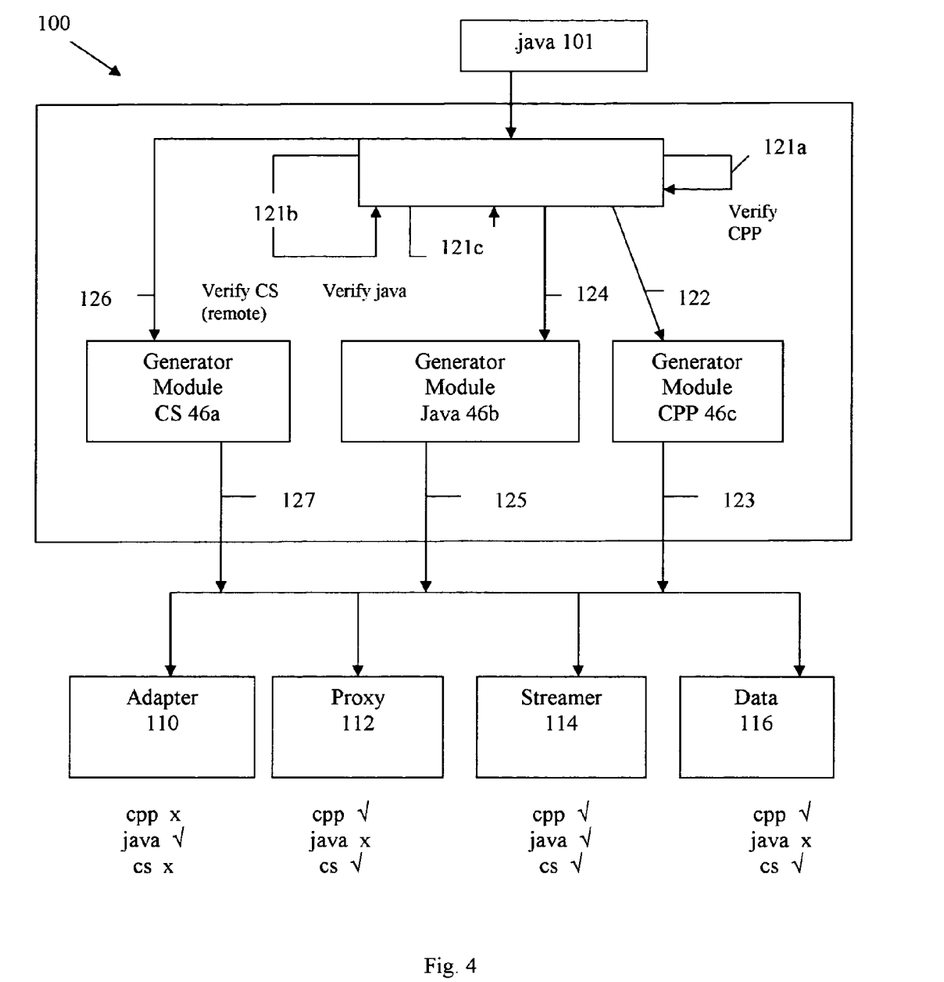
FIG. 4 depicts a flow diagram describing a generating function in accordance with an embodiment of the present invention.

Referring now to FIG. 4, another embodiment 100 of the present invention is depicted. If C++ is selected as one of the target languages, the user interface verifies 121*a* the repository to see if the user has accurately provided all the information needed to perform such mapping. If C# is selected as one of the target languages, the user interface verifies 121*b* the repository to see if the user has accurately provided all the information needed to perform such mapping. The user interface verifies 121*c* the repository to see if the user has accurately provided all the information needed to perform mapping of the source language data types.

If CPP is selected as a target language by the user: the user interface invokes 122 the CPP generator module 46*c* to generate the necessary classes. The CPP generator module 46*c* generates 123: Proxy Classes in C++ 112, Streamer Classes in C++ 114, and Data Classes in C++ 116. It should be noted that since CPP is not the original source language, adapter classes are not generated. For Java source language applications: the user interface invokes 124 the JAVA generator module 46*b* to generate the necessary classes. The JAVA generator module 46*b* generates 125: Adapter Classes in JAVA 110 and Streamer Classes in JAVA 114. It should be noted that since JAVA is the original source language, proxy classes and data classes are not generated. If C# is selected as a target language by the user: the user interface invokes 126 the Csharp generator module 46*a* to generate the necessary classes. The Csharp generator module 46*a* generates: Proxy Classes in Csharp 112, Streamer Classes in Csharp 114, and Data Classes in Csharp 116. It should be noted that since Csharp is not the original source language, adapter classes are not generated.

In one embodiment of the present invention, a method for integrating an original language application with a target language application comprises receiving properties related to a source file in the original language application, parsing the source file based on the received properties into a common format for the original language application and the target language application, receiving the parsed source file by a repository module, and placing contents of the received parsed source file on an interface. The method further comprises storing the received parsed source file in a repository file.

In another embodiment of the present invention, a method for integrating an original language application with a target language application comprises receiving information from an interface, wherein the information includes at least one of: a class, methods of the class, and fields of the class, wherein the methods of the class include at least one of: parameters of the method, result of the method, exceptions of the method, a data type of the parameter, a data type of the result, and a data type of the exception, wherein the fields of the class include at least one data type of the field, and integrating the original language application with the target language application based on the received information, wherein the received information is at least one of: a non-complex class and a complex class. The method further comprises: mapping of the complex class to at least one target language, a pre-defined mapping of the non-complex class to at least one target language. The method also comprises repeating the steps in the method for at least one of a following construct including: classes, fundamental data types, structures, unions, type definitions, interfaces, enumerations, reference types, pointer types, and template types.

In yet another embodiment of the present invention, a method for integrating an original language application with a target language application comprises receiving properties related to a target language, and generating integration classes in the target language based on the received properties, wherein the generated integration classes in the target language correspond to classes in an original language. The method further comprises generating adapter classes related to the original application, generating proxy classes related to the target application, wherein the proxy classes are adapted to communicate with the adapter classes, generating data types related to the target application, wherein the data types related to the remote application are equivalent to the data types related to the original application, and generating streamers related to the target application, wherein the streamers related to the remote application are adapted to be utilized by the proxy classes, wherein the adapter classes are adapted to provide access to functions of the original application.

The communication comprises sending input parameters, related to the original application, to the adapter classes, receiving output parameters, return values, and exceptions, related to the original application, at the proxy classes, receiving input parameters, related to the original application, at the adapter classes, and sending output parameters, return values, and exceptions, related to the original application, to the proxy classes, wherein the streamers related to the remote application are adapted to: convert data communicated by the proxy classes to the adapter classes and convert data communicated by the adapter classes to the proxy classes, wherein the data is converted into a neutral data format (marshaling), and wherein the streamers are adapted to receive the data in neutral data format and convert the data to corresponding data types (unmarshaling).

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the functionality performed by the various modules described above, can be performed by one or more of the module in the current architecture, a distributed architecture and on or via any electronic device. Further, such functionality may be performed by described, depicted, un-described and/or un-depicted contents of the modules.

What is claimed is:

1. A method implemented at least in part by a computer, the method comprising:
   receiving, by a user interface, properties for an original language provided by a user, wherein the properties for the original language include methods and classes of the original language, and wherein the properties for the original language are related to a source file in an original language application;
   parsing, based on the properties for the original language of the original language application, the source file into a common format for the original language application and a target language application;
   presenting contents of the parsed source file on the user interface, wherein the contents of the parsed source file include representations of the methods and classes for the original language of the original language application;
   receiving, the user interface, a selection of one or more of the contents of the parsed source file to be exported to the target language application;
   verifying, by the user interface and based on a target language of the target language application, that the properties for the original language of the original language application are accurate and sufficient to facilitate mapping of data types in the original language of the original language application to the target language of the target language application; and
   integrating, based on the selection of the one or more of the contents of the parsed source file, the original language application with the target language application by mapping data types in the original language of the original language application to the target language of the target language application.

2. The method of claim 1, further comprising storing the parsed source file in a repository file.

3. A method implemented at least in part by a computer, the method comprising:
   receiving, by a user interface, properties for an original language provided by a user, wherein the properties for the original language include methods and classes of the original language, and wherein the properties for the original language are related to a source file in an original language application;
   parsing, based on the properties for the original language of the original language application, the source file into a common format for the original language application and a target language application;
   verifying, by the user interface and based on a target language of the target language application, that the properties for the original language of the original language application are accurate and sufficient to facilitate mapping of data types in the original language of the original language application to the target language of the target language application; and
   integrating, based on a selection of one or more contents of the parsed source file that include methods and classes of the original language, the original language application with the target language application by mapping data types in the original language of the original language application to the target language of the target language application.

4. A non-transitory computer-readable medium having instructions stored thereon, the instructions comprising:
   instructions to receive, by a user interface, properties for an original language provided by a user, wherein the properties for the original language include methods and classes of the original language, and wherein the properties for the original language are related to a source file in the original language;
   instructions to parse, based on the properties for the original language, the source file into a common format for the original language and a target language;
   instructions to display contents of the parsed source file on the user interface, wherein individual contents of the parsed source file include representations of the methods and classes of the original language, and wherein the representations of the methods and classes of the original language are selectable the user interface;
   instructions to verify, by the user interface and based on the target language, that the properties for the original language are accurate and sufficient to facilitate mapping of data types to the target language, wherein the data types are related to the source file in the original language; and instructions to integrate, based on the selection of the representations of the methods and classes of the original language, the original language with the target language by mapping data types in the original language to the target language.

5. A method implemented at least in part by a computer, the method comprising the steps of:
   receiving, by a user interface, information provided by a user, wherein the received information includes at least one of a class, methods of the class, or fields of the class;
   wherein the methods of the class include at least one of a parameter of the method, a result of the method, an exception of the method, a data type of the parameter, a data type of the result, or a data type of the exception;
   wherein the fields of the class include at least one data type of a field;
   receiving, by the user interface, a selection of at least a portion of the received information to be exported to a target language application;
   verifying, by the user interface and based on a target language of the target language application, that the received information is accurate and sufficient to facilitate mapping of data types to the target language application, wherein the data types are related to the selection of the at least a portion of the received information;
   mapping classes and data types in an original language application to classes and data types in the target language application; and
   integrating the original language application with the target language application based on the received information, the selection of the at least a portion of the received information, and the mapping of classes and data types.

6. The method of claim 5, wherein the received information comprises at least one of a non-complex class or a complex class.

7. The method of claim 6, further comprising mapping the complex class to the target language application.

8. The method of claim 6, further comprising utilizing a pre-defined mapping of the non-complex class to the target language application.

9. The method of claim 5, further comprising repeating the steps in claim 5 for at least one of the following constructs comprising fundamental data types, structures, unions, type definitions, interfaces, enumerations, reference types, pointer types, or template types.

10. A non-transitory computer-readable medium having instructions stored thereon, the instructions comprising:
   instructions to receive, by a user interface, information provided by a user, wherein the received information includes at least one of a class, methods of the class, or fields of the class;
   instructions to verify, by the user interface and based on a target language of a target language application, that the received information is accurate and sufficient to facilitate mapping of data types in an original language of an original language application to the target language of the target language application; and
   instructions to integrate, based on the received information, the original language application with the target language application by mapping classes and data types in the original language of the original language application to classes and data types in the target language of the target language application.

11. A method implemented at least in part by a computer, the method comprising:
   receiving, by a user interface, properties related to a target language of a target language application provided by a user, wherein the properties related to the target language of the target language application include methods and classes of the target language of the target language application;
   verifying, by the user interface and based on the target language of the target language application, that the properties related to the target language of the target language application are accurate and sufficient to facilitate generating of integration classes in the target language of the target language application; and
   generating, based on the properties related to the target language of the target language application, the integration classes in the target language of the target language application, wherein the generated integration classes in the target language of the target language application correspond to classes in an original language of an original language application.

12. The method of claim 11, further comprising generating adapter classes related to the original language application.

13. The method of claim 12, further comprising generating proxy classes related to the target language application, wherein the proxy classes are adapted to communicate with the adapter classes.

14. The method of claim 13, further comprising generating data types related to the target language application, wherein the data types related to the target language application are equivalent to data types related to the original language application.

15. The method of claim 14, further comprising generating streamers related to the target language application, wherein the streamers related to the target language application are adapted to be utilized by the proxy classes.

16. The method of claim 15, wherein the streamers related to the target language application are adapted to:
   convert data communicated by the proxy classes to the adapter classes; and
   convert data communicated by the adapter classes to the proxy classes.

17. The method of claim 16, wherein one or both of data communicated by the proxy classes or data communicated by the adapter classes is converted into a neutral data format.

18. The method of claim 17, wherein the streamers are adapted to receive one or both of data communicated by the proxy classes or data communicated by the adapter classes in the neutral data format and to convert the data communicated by the proxy classes or the data communicated by the adapter classes to corresponding data types.

19. The method of claim 13, further comprising sending input parameters, related to the original language application, to the adapter classes.

20. The method of claim 13, further comprising receiving output parameters, return values, and exceptions, related to the original language application, at the proxy classes.

21. The method of claim 13, further comprising receiving input parameters, related to the original language application, at the adapter classes.

22. The method of claim 13, further comprising sending output parameters, return values, and exceptions, related to the original language application, to the proxy classes.

23. The method of claim 12, wherein the adapter classes are adapted to provide access to functions of the original language application.

24. A non-transitory computer-readable medium having instructions stored thereon, the instructions comprising:
   instructions to receive, by a user interface, properties related to a target language provided by a user, wherein the properties related to the target language include methods and classes of the target language;
instructions to verify, by the user interface and based on the target language, that the properties related to the target language are accurate and sufficient to facilitate generating of integration classes in the target language; and
instructions to generate, based on the properties related to the target language, the integration classes in the target language, wherein the generated integration classes in the target language correspond to classes in an original language.

25. A system comprising:
one or more processors; and
one or more non-transitory computer-readable media having instructions stored thereon, the instructions comprising:
instructions to receive, by a user interface, properties for an original language provided by a user, wherein the properties for the original language are related to one or more source files in an original language application;
instructions to create a repository structure;
instructions to import the one or more source files into the repository structure;
instructions to present contents of the repository structure associated with the one or more source files on the user interface, wherein the contents of the repository structure include methods and classes for the original language of the original language application;
instructions to verify, by the user interface and based on a target language of a target language application, that the properties for the original language of the original language application are accurate and sufficient to facilitate mapping of data types in the original language application to the target language application; and
instructions to receive information provided by a selection of one or more of the contents of the repository structure through the user interface, wherein the received information is adapted to integrate the original language application with the target language application by mapping data types in the original language application to the target language application.

* * * * *

UNITED STATES PATENT AND TRADEMARK OFFICE
CERTIFICATE OF CORRECTION

| | |
|---|---|
| PATENT NO. | : 8,578,349 B1 |
| APPLICATION NO. | : 11/086120 |
| DATED | : November 5, 2013 |
| INVENTOR(S) | : Dubagunta |

It is certified that error appears in the above-identified patent and that said Letters Patent is hereby corrected as shown below:

On the Title Page:

On Page 3, item (56), under "OTHER PUBLICATIONS", in Column 1, Line 11, delete "Inteligent" and insert -- Intelligent --, therefor.

On Page 3, item (56), under "OTHER PUBLICATIONS", in Column 1, Line 18, delete "IEE," and insert -- IEEE, --, therefor.

On Page 3, item (56), under "OTHER PUBLICATIONS", in Column 1, Line 34, delete "18 pages" and insert -- 18 pages. --, therefor.

On Page 3, item (56), under "OTHER PUBLICATIONS", in Column 2, Line 4, delete "28 pages," and insert -- 28 pages. --, therefor.

On Page 3, item (56), under "OTHER PUBLICATIONS", in Column 2, Line 13, delete "3 paes." and insert -- 3 pages. --, therefor.

On Page 3, item (56), under "OTHER PUBLICATIONS", in Column 2, Line 16, delete "(IDES '05)," and insert -- (IDEAS '05), --, therefor.

On Page 3, item (56), under "OTHER PUBLICATIONS", in Column 2, Line 19, delete "Broadbank" and insert -- Broadband --, therefor.

On Page 3, item (56), under "OTHER PUBLICATIONS", in Column 2, Line 19, delete "Framw" and insert -- Frame --, therefor.

On Page 3, item (56), under "OTHER PUBLICATIONS", in Column 2, Line 41, delete "4 (Apr. 2001)," and insert -- (Apr. 4, 2001), --, therefor.

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,578,349 B1

On Page 3, item (56), under "OTHER PUBLICATIONS", in Column 2, Lines 49-50, delete "Service"," and insert -- Services", --, therefor.

On Page 3, item (56), under "OTHER PUBLICATIONS", in Column 2, Lines 61-62, delete "(Nov. 19, 2012)," and insert -- (Nov. 19, 2010), --, therefor.

On Page 4, item (56), under "OTHER PUBLICATIONS", in Column 1, Line 24, delete "Heterogenous" and insert -- Heterogeneous --, therefor.

On Page 4, item (56), under "OTHER PUBLICATIONS", in Column 1, Line 24, delete "Teschnischen" and insert -- Technischen --, therefor.

On Page 4, item (56), under "OTHER PUBLICATIONS", in Column 1, Line 32, delete "Computer. Technology" and insert -- Computer Technology --, therefor.

On Page 4, item (56), under "OTHER PUBLICATIONS", in Column 1, Line 44, delete "in A" and insert -- in a --, therefor.

On Page 4, item (56), under "OTHER PUBLICATIONS", in Column 2, Line 3, delete "Fudan. University," and insert -- Fudan University, --, therefor.

On Page 4, item (56), under "OTHER PUBLICATIONS", in Column 2, Line 4, delete "6." and insert -- 6 pages. --, therefor.

On Page 4, item (56), under "OTHER PUBLICATIONS", in Column 2, Line 7, delete "Polytechnic. University," and insert -- Polytechnic University, --, therefor.

On Page 4, item (56), under "OTHER PUBLICATIONS", in Column 2, Line 10, delete "Nov. 29, 2013" and insert -- Nov. 29, 2010, 20 pages. --, therefor.

On Page 4, item (56), under "OTHER PUBLICATIONS", in Column 2, Line 13, delete "(0Appr. 28, 201)," and insert -- (Jul 28, 2010), --, therefor.

On Page 4, item (56), under "OTHER PUBLICATIONS", in Column 2, Line 21, delete "(Sep. 15, 20051)," and insert -- (Sep. 15, 2010), --, therefor.

On Page 4, item (56), under "OTHER PUBLICATIONS", in Column 2, Line 34, delete "Retreived" and insert -- Retrieved --, therefor.

On Page 4, item (56), under "OTHER PUBLICATIONS", in Column 2, Line 38, delete "ISB: 4615-2339-1," and insert -- ISBN: 7615-2339-1, --, therefor.

On Page 4, item (56), under "OTHER PUBLICATIONS", in Column 2, Line 41, delete "0/7803-8856," and insert -- 0-7803-8856, --, therefor.

CERTIFICATE OF CORRECTION (continued)
U.S. Pat. No. 8,578,349 B1

On Page 4, item (56), under "OTHER PUBLICATIONS", in Column 2, Line 48, delete "No. 4,." and insert -- No. 4, --, therefor.

In the Specification:

In Column 4, Line 22, delete "For Java" and insert -- For Java™, a programming language that derives much of its syntax from C and C++ but has a simpler object model and fewer low-level facilities, --, therefor.

In the Claims:

In Column 6, Line 1, in Claim 1, delete "the user" and insert -- by the user --, therefor.

In Column 6, Line 62, in Claim 4, delete "the user" and insert -- by the user --, therefor.

UNITED STATES PATENT AND TRADEMARK OFFICE
CERTIFICATE OF CORRECTION

PATENT NO. : 8,578,349 B1  
APPLICATION NO. : 11/086120  
DATED : November 5, 2013  
INVENTOR(S) : Saikumar V. Dubagunta Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1846 days.

Signed and Sealed this
Fourteenth Day of April, 2015

Michelle K. Lee
*Director of the United States Patent and Trademark Office*